US012722889B2

(12) United States Patent
Li et al.

(10) Patent No.: US 12,722,889 B2
(45) Date of Patent: Sep. 1, 2026

(54) STORAGE PALLET AND AUTOMATED GUIDED VEHICLE

(71) Applicant: CONTEMPORARY AMPEREX TECHNOLOGY (HONG KONG) LIMITED, Hong Kong (CN)

(72) Inventors: Yankun Li, Ningde (CN); Bo Liu, Ningde (CN); Lixin Guo, Ningde (CN); Shaoteng Ren, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 415 days.

(21) Appl. No.: 18/349,740

(22) Filed: Jul. 10, 2023

(65) Prior Publication Data

US 2024/0239603 A1 Jul. 18, 2024

Related U.S. Application Data

(63) Continuation of application No. PCT/CN2023/081730, filed on Mar. 15, 2023.

(30) Foreign Application Priority Data

Jan. 12, 2023 (CN) ......................... 202320081690.2

(51) Int. Cl.
*B65G 43/02* (2006.01)
*B65G 1/06* (2006.01)
*B65G 1/137* (2006.01)

(52) U.S. Cl.
CPC ........... *B65G 1/065* (2013.01); *B65G 1/1375* (2013.01); *B65G 43/02* (2013.01); *B65G 2203/0233* (2013.01)

(58) Field of Classification Search
CPC ...... B65G 1/065; B65G 1/1375; B65G 43/02; B65G 2203/0233
See application file for complete search history.

(56) References Cited

U.S. PATENT DOCUMENTS 5,379,229 A * 1/1995 Parsons ................ B65G 1/1378 700/215
5,895,195 A * 4/1999 Simmons ............... B65G 65/00 414/811

(Continued)

FOREIGN PATENT DOCUMENTS

CN 208103038 U 11/2018
CN 109519679 A 3/2019

(Continued)

OTHER PUBLICATIONS

The World Intellectual Property Organization (WIPO) International Search Report for PCT/CN2023/081730 May 20, 2023 7 pages (including English translation).

(Continued)

*Primary Examiner* — Saul Rodriguez
*Assistant Examiner* — Ashley K Romano
(74) *Attorney, Agent, or Firm* — Anova Law Group, PLLC

(57) ABSTRACT

A storage pallet includes two bracket arms spaced apart along a first direction to form an avoidance region between the two bracket arms. Each of the two bracket arms includes a first end and a second end in a second direction orthogonal to the first direction, and the first ends of the two bracket arms are not connected, so as to form, between the two first ends, an opening communicating with the avoidance region.

19 Claims, 10 Drawing Sheets

(56) References Cited

U.S. PATENT DOCUMENTS

| | | | | |
|---|---|---|---|---|
| 6,755,322 | B1 * | 6/2004 | Herzog | G07F 11/58 221/133 |
| 9,663,292 | B1 * | 5/2017 | Brazeau | G05D 1/0297 |
| 10,438,030 | B2 * | 10/2019 | Ramon | G06K 19/07758 |
| 11,958,195 | B2 * | 4/2024 | Takagi | G05B 19/41895 |
| 2006/0245862 | A1 * | 11/2006 | Hansl | B65G 1/0435 414/281 |
| 2007/0140817 | A1 * | 6/2007 | Hansl | B66F 9/07 414/277 |
| 2022/0274779 | A1 | 9/2022 | Qian et al. | |
| 2023/0050724 | A1 * | 2/2023 | Iacaruso | B65G 49/067 |
| 2023/0331484 | A1 * | 10/2023 | Elazary | B65G 1/1371 |
| 2024/0017924 | A1 * | 1/2024 | Wang | B65G 1/1375 |
| 2024/0043207 | A1 * | 2/2024 | Cheng | B65G 1/1373 |
| 2024/0150123 | A1 * | 5/2024 | Richardson | G07F 11/165 |
| 2024/0165819 | A1 * | 5/2024 | Li | B65G 1/0421 |

FOREIGN PATENT DOCUMENTS

| | | | |
|---|---|---|---|
| CN | 210794517 | U | 6/2020 |
| CN | 111470242 | A | 7/2020 |
| CN | 212244808 | U | 12/2020 |
| CN | 215249367 | U | 12/2021 |
| WO | 2022199448 | A1 | 9/2022 |

OTHER PUBLICATIONS

The European Patent Office (EPO) The Extended European Search Report for Application No. 23745376.6 Feb. 24, 2025 6 Pages.

* cited by examiner

STORAGE PALLET AND AUTOMATED GUIDED VEHICLE

CROSS-REFERENCE TO RELATED APPLICATIONS

This application is a continuation of International Application No. PCT/CN2023/081730, filed on Mar. 15, 2023, which claims priority to Chinese Patent Application No. 20/2320081690.2, filed on Jan. 12, 2023, which are incorporated herein by reference in their entirety.

TECHNICAL FIELD

This application relates to the field of commodity handling technologies, and in particular, to a storage pallet and an automated guided vehicle.

BACKGROUND

In recent years, there has been a great leap in development of new energy vehicles. In the field of electromobiles, batteries serving as power sources of the electromobiles play an indispensable role. As core components of new energy vehicles, the batteries have to meet high requirements in terms of both safety and cycle life. During research and development or production, batteries inevitably need to be handled for testing, shipping, or other processes. However, during handling of the batteries, the batteries need to be protected to greatest extent, and problems such as dropping or collision of the batteries need to be avoided to greatest extent, to ensure safety and service life of the batteries. Therefore, how to improve the safety of the batteries during handling is an urgent problem that needs to be resolved.

SUMMARY

Embodiments of this application provide a storage pallet and an automated guided vehicle, which can improve safety of a battery during handling.

According to a first aspect, an embodiment of this application provides a storage pallet, including: bracket arms, where two bracket arms are provided and spaced apart along a first direction to define an avoidance region between the two bracket arms, two ends of the bracket arm in a second direction are respectively a first end and a second end, the second direction is orthogonal to the first direction, and first ends of the two bracket arms are not connected, so as to define, between the two first ends, an opening communicating with the avoidance region.

In the foregoing technical solution, the safety of the battery during handling can be improved, which facilitates production and research and development of the battery. In addition, manpower can be saved, efficiency of production, research and development, testing, and the like can be increased, and costs of the production, research and development, testing, and the like can be reduced. In addition, a structure of the battery tray can be simplified and production costs of the battery tray can be reduced.

In some embodiments, a first stop member is disposed on a top of at least one bracket arm, the bracket arm has a portion on a side, facing the avoidance region, of the first stop member to support a commodity, and the first stop member is configured to stop the commodity from exceeding the first stop member along the first direction.

In the foregoing technical solution, the first stop member is disposed on the top of the bracket arm, which can prevent the commodity from leaving the corresponding bracket arm along the first direction, thereby better protecting the commodity.

In some embodiments, a surface, facing the avoidance region, of the first stop member forms a first guide surface, and the first guide surface is inclined from top to bottom in a direction approaching the avoidance region.

In the foregoing technical solution, an unloading accuracy requirement of the battery tray can be reduced, unloading efficiency can be improved, and a risk of damaging the battery because the first stop member collides with the battery tray can be reduced, to further improve the safety of the battery during handling.

In some embodiments, the first stop member extends along the second direction, and length of the first stop member along the second direction is greater than or equal to length of the avoidance region along the second direction.

In the foregoing technical solution, the structure of the first stop member can be simplified, processing and assembly of the first stop member is facilitated, production efficiency of the storage pallet is improved, and costs of the storage pallet are reduced. In addition, the first stop member can have a better stop effect on battery trays of different standards within a larger length range, thereby improving a protection effect on the battery.

In some embodiments, a mounting position of the first stop member relative to the bracket arm is adjustable along the first direction; and/or the first stop member is detachably connected to the bracket arm.

In the foregoing technical solution, the storage pallet is applicable for storage of battery trays of various standards, and has a wide application scope.

In some embodiments, a detector for detecting the commodity is disposed on the top of the bracket arm, and the detector is disposed on a side, extending away from the avoidance region in the first direction, of the first stop member.

In the foregoing technical solution, the detector does not interfere with, affect, or collide with the commodity on the bracket arm, thereby improving safety of picking up and placing the commodity.

In some embodiments, the detector for detecting the commodity is disposed on the top of the bracket arm.

In the foregoing technical solution, the detector is disposed on the storage pallet, which can improve reliability and accuracy of picking up and placing the commodity.

In some embodiments, the detector includes an emitting end and a receiving end disposed opposite each other along the first direction, the emitting end and the receiving end are respectively disposed on the two bracket arms, and the receiving end is configured to receive a beam emitted by the emitting end.

In the foregoing technical solution, detection can be implemented easily and reliably, and accuracy of detection can be improved.

In some embodiments, a second stop member is disposed on a top of a first end of at least one bracket arm, and the second stop member is configured to stop the commodity from exceeding the second stop member along a direction from the second end to the first end.

In the foregoing technical solution, the second stop member is disposed on the top of the bracket arm, which can prevent the commodity from leaving the corresponding bracket arm along the direction from the second end to the first end, thereby better protecting the commodity.

In some embodiments, a surface, facing the second end, of the second stop member forms a second guide surface, and the second guide surface is inclined from top to bottom in a direction approaching the second end.

In the foregoing technical solution, an unloading accuracy requirement of the battery tray can be reduced, unloading efficiency can be improved, and a risk of damaging the battery because the second stop member collides with the battery tray can be reduced, to further improve the safety of the battery during handling.

In some embodiments, the second stop member is detachably connected to the bracket arm.

In the foregoing technical solution, the second stop member can be replaced or removed as required.

In some embodiments, the storage pallet further includes a connecting arm, and the connecting arm is connected to second ends of the two bracket arms.

In the foregoing technical solution, disposition of the connecting arm can improve overall structure strength of the storage pallet, thereby improving the storage safety of the commodity. In addition, when the commodity has a great dimension in the second direction, the connecting arm may alternatively be configured to support a part of the commodity, to disperse force on the storage pallet, thereby improving reliability and safety of supporting the commodity by the storage pallet.

In some embodiments, a third stop member is disposed on a top of the connecting arm, and the third stop member is configured to stop the commodity from exceeding the third stop member along a direction from the first end to the second end.

In the foregoing technical solution, the third stop member is disposed on the top of the connecting arm, which can prevent the commodity from leaving the corresponding bracket arm along the direction from the first end to the second end, thereby better protecting the commodity.

In some embodiments, a surface, facing the avoidance region, of the third stop member forms a third guide surface, and the third guide surface is inclined from top to bottom in a direction approaching the first end.

In the foregoing technical solution, an unloading accuracy requirement of the battery tray can be reduced, unloading efficiency can be improved, and a risk of damaging the battery because the third stop member collides with the battery tray can be reduced, to further improve the safety of the battery during handling.

In some embodiments, the third stop member extends along the first direction, and length of the third stop member along the first direction is greater than or equal to length of the avoidance region along the first direction.

In the foregoing technical solution, the structure of the third stop member can be simplified, processing and assembly of the third stop member is facilitated, production efficiency of the storage pallet is improved, and costs of the storage pallet are reduced. In addition, the third stop member can have a better stop effect on battery trays of different standards within a larger length range, thereby improving a protection effect on the battery.

In some embodiments, a mounting position of the third stop member relative to the connecting arm is adjustable along the second direction; and/or the third stop member is detachably connected to the connecting arm.

In the foregoing technical solution, the storage pallet is applicable for storage of battery trays of various standards, and has a wide application scope.

In some embodiments, the connecting arm and the bracket arm are integrally formed members.

In the foregoing technical solution, the storage pallet is convenient to process, and overall structure strength of the storage pallet can be better improved, thereby further improving the storage safety of the commodity.

According to a second aspect, an embodiment of this application further provides an automated guided vehicle, including: the foregoing storage pallet; a rack body, where the rack body includes a chassis and a vertical frame disposed on the chassis, the vertical frame is provided with a plurality of storage pallets spaced apart along a vertical direction, two sides of the vertical frame in the second direction are respectively a first side and a second side, and each storage pallet is on a second side of the vertical frame; and a pick-and-place assembly, where the pick-and-place assembly is connected to the rack body and can be lifted and rotated on a first side of the vertical frame, the pick-and-place assembly includes a telescopic fork, and the avoidance region is configured to avoid the fork when the fork picks or places a commodity from or onto the storage pallet.

In the foregoing technical solution, the pick-and-place assembly is disposed to pick up and place the commodity, which effectively saves manpower and improves efficiency of picking up and placing the commodity. In addition, the foregoing storage pallet is provided as the buffer pallet of the automated guided vehicle, which can effectively improve safety in a process of picking up and placing the commodity.

In some embodiments, the chassis includes a first portion and a second portion, the first portion is on the first side of the vertical frame, the second portion is on the second side of the vertical frame, an end, farther away from the vertical frame, of the first portion is provided with a first obstacle avoidance apparatus, an end, farther away from the vertical frame, of the second portion is provided with a second obstacle avoidance apparatus, and the first obstacle avoidance apparatus and the second obstacle avoidance apparatus are located at diagonal positions of the chassis.

In the foregoing technical solution, the automated guided vehicle can better avoid the obstacle, thereby improving the safety of the battery during handling. In addition, the quantity of avoidance apparatuses is small, which can reduce the costs of the automated guided vehicle.

In some embodiments, the pick-and-place assembly has a first vision apparatus, and a second vision apparatus is present on a top of the vertical frame.

In the foregoing technical solution, the first vision apparatus and the second vision apparatus are disposed, which can improve accuracy of picking up and placing the commodity and facilitates obstacle avoidance of the automated guided vehicle.

In some embodiments, a mounting position of the storage pallet on the vertical frame is adjustable along a vertical direction; and/or at least six storage pallets are provided.

In the foregoing technical solution, the mounting position of the storage pallet along the vertical direction can be adjusted based on height of the commodity, so that each layer of storage pallet can store the commodity, thereby improving an application scope of the automated guided vehicle and improving the spatial utilization of the automated guided vehicle.

In some embodiments, two vertical frames are provided and spaced apart on two sides of the storage pallet along the first direction, two bracket arms of each storage pallet are respectively connected to inner side walls of the vertical frame on the two sides, an outer side wall of the vertical frame is a solid plate, and the vertical frame has a dimension W1 in the second direction that is more than three times a dimension W2 in the first direction.

In the foregoing technical solution, the vertical frame can have better support and protection effects on the storage pallet, thereby improving reliability and safety of supporting the commodity by the storage pallet and improving the load-bearing capability of the automated guided vehicle.

In some embodiments, the pick-and-place assembly includes a lifting portion and a rotating portion, the fork is disposed on the rotating portion, the lifting portion cooperates with the rack body to be liftable along the vertical frame, the rotating portion is rotatably connected to the lifting portion, to be synchronously lifted or lowered along with the lifting portion and be rotatable around a vertical axis relative to the lifting portion, the lifting portion includes two fourth stop members spaced apart along the first direction, and a distance between the two fourth stop members in the first direction is greater than a dimension of the storage pallet in the first direction.

In the foregoing technical solution, the pick-and-place assembly has a simple structure and operates reliably, so that a risk of falling of the commodity from the fork can be reduced by using a limit function of the fourth stop member, thereby improving the safety of the commodity during handling.

In some embodiments, the pick-and-place assembly includes a rotating portion, the rotating portion includes a main body and a stop portion, the fork is disposed on the main body and protrudes from a top of the main body, the stop portion is disposed on the main body and protrudes from the top of the main body, and the stop portion is on a side of the fork along a retraction direction of the fork.

In the foregoing technical solution, the fork is disposed to protrude from the top of the main body, and a stop portion is disposed in the retraction direction of the fork, which can improve safety of handling the battery.

In some embodiments, the fork includes a base portion, a first extension segment, and a second extension segment, the first extension segment is telescopic relative to the base portion, and the second extension segment is telescopic relative to the first extension segment.

In the foregoing technical solution, the fork can have a longer telescoping range and a wider application scope.

BRIEF DESCRIPTION OF DRAWINGS

To describe the technical solutions in the embodiments of this application more clearly, the following briefly describes the accompanying drawings required for describing the embodiments. It should be understood that the accompanying drawings below only show some embodiments of this application and therefore, should not be considered as limitations on the scope. A person of ordinary skill in the art may still derive other related drawings from the accompanying drawings without creative efforts.

REFERENCE SIGNS

Figure 1:
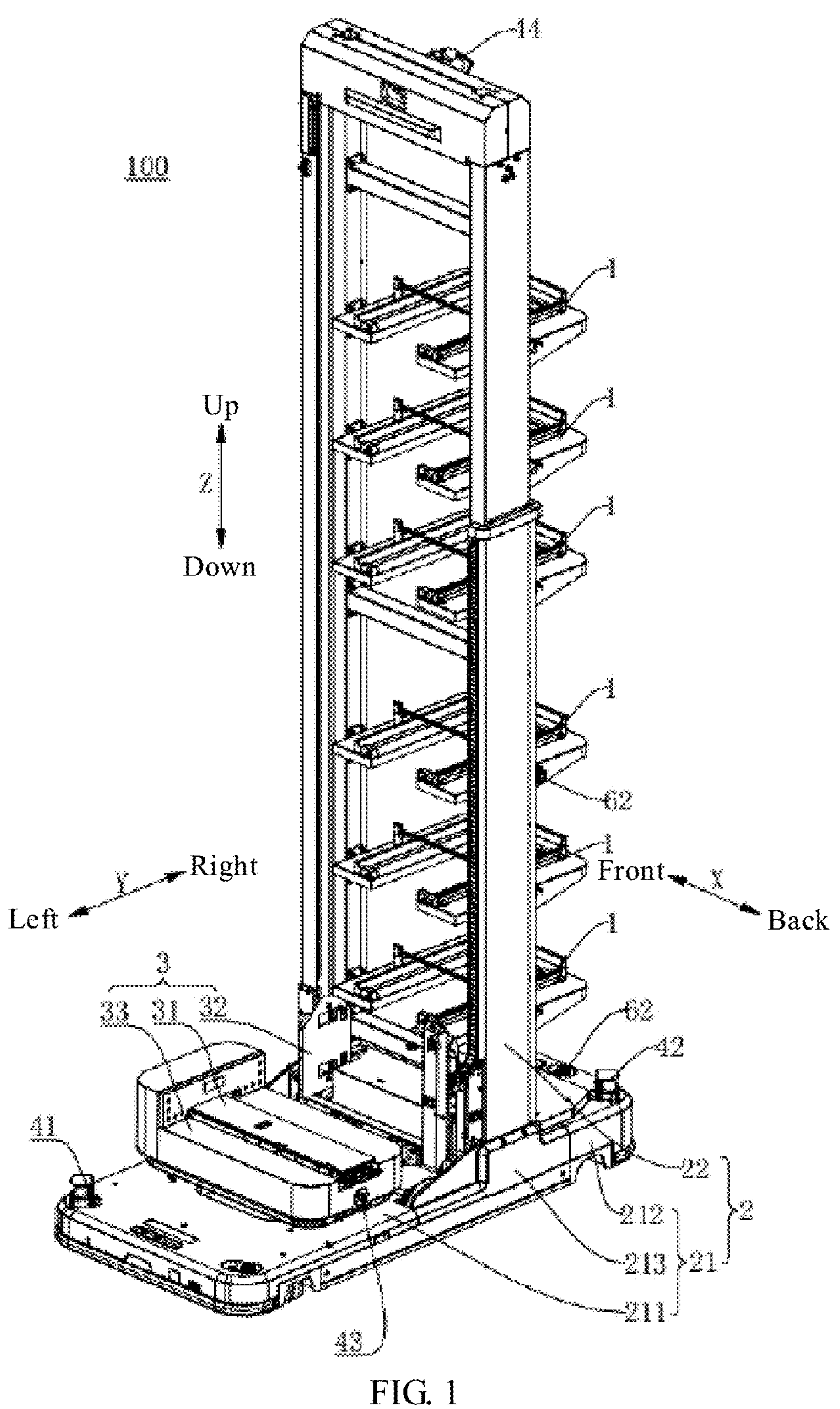
FIG. 1 is a three-dimensional diagram of an angle of an automated guided vehicle according to some embodiments of this application.

Automated guided vehicle 100; battery 200; battery tray 300; storage pallet 1; bracket arm 11; first end 1*a*; second end 1*b*; avoidance region 12; opening 13; first stop member 14; first guide surface 141; second stop member 15; second guide surface 151; connecting arm 16; third stop member 17; third guide surface 171; rack body 2; chassis 21; first portion 211; second portion 212; third portion 213; vertical frame 22; pick-and-place assembly 3; fork 31; base portion 311; first extension segment 312; second extension segment 313; lifting portion 32, bottom plate 321, fourth stop member 322, rotating portion 33; main body 331; stop portion 332; first obstacle avoidance apparatus 41; second obstacle avoidance apparatus 42; first vision apparatus 43; second vision apparatus 44; detector 5; emitting end 51, receiving end 52; loudspeaker apparatus 61; emergency stop apparatus 62; pneumatic anti-collision apparatus 7; display screen 81; indicator light 82; reset apparatus 91; power supply 92; first direction X; second direction Y; and vertical direction Z.

DESCRIPTION OF EMBODIMENTS

To make the objectives, technical solutions, and advantages of the embodiments of this application clearer, the following clearly describes the technical solutions in the embodiments of this application with reference to the accompanying drawings in the embodiments of this application. Apparently, the embodiments described are some rather than all embodiments of this application. All other embodiments obtained by a person of ordinary skill in the art based on the embodiments of this application without creative efforts shall fall within the protection scope of this application.

Unless otherwise defined, all technical and scientific terms used in this application shall have the same meanings as commonly understood by those skilled in the art to which this application relates. The terms used in the specification of this application are intended to merely describe the specific embodiments rather than to limit this application. The terms "include", "comprise", and any variations thereof in the specification and claims of this application as well as the foregoing description of drawings are intended to cover non-exclusive inclusions. In the specification, claims, or accompanying drawings of this application, the terms "first", "second", and the like are intended to distinguish between different objects rather than to indicate a particular order or relative importance.

Reference to "embodiment" in this application means that specific features, structures, or characteristics described with reference to the embodiment may be included in at least one embodiment of this application. The word "embodiment" appearing in various places in the specification does not necessarily refer to the same embodiment or an independent or alternative embodiment that is exclusive of other embodiments.

In the description of this application, it should be noted that unless otherwise specified and defined explicitly, the terms "mount", "connect", "join", and "attach" should be understood in their general senses. For example, they may refer to a fixed connection, a detachable connection, or an integral connection, and may refer to a direct connection, an indirect connection via an intermediate medium, or an internal communication between two elements. A person of ordinary skill in the art can understand specific meanings of these terms in this application based on specific situations.

The term "and/or" in this application is only an associative relationship for describing associated objects, indicating that three relationships may be present. For example, A and/or B may indicate three cases: presence of only A; presence of both A and B; and presence of only B. In addition, the character "/" in this application generally indicates an "or" relationship between contextually associated objects.

In the embodiments of this application, the same reference signs denote the same members. For brevity, in different embodiments, detailed descriptions of the same members are not repeated. It should be understood that, as shown in the accompanying drawings, sizes such as thickness, length, and width of various members and sizes such as thickness, length, and width of integrally formed apparatuses in the embodiments of this application are merely for illustrative purposes and should not constitute any limitations on this application.

In this application, "a plurality of" means more than two (inclusive).

In recent years, there has been a great leap in development of new energy vehicles. In the field of electromobiles, batteries serving as power sources of the electromobiles play an indispensable role. The batteries, as core components of new energy vehicles, have to meet high requirements in terms of both safety and cycle life.

During research and development or production, batteries inevitably need to be handled for testing, shipping, or other processes. However, during handling of the batteries, the batteries need to be protected to greatest extent, and problems such as dropping or collision of the batteries need to be avoided to greatest extent, to ensure safety and service life of the batteries. Therefore, how the safety of the batteries during handling is improved is an urgent problem that needs to be resolved.

The inventor has found that when an automated guided vehicle (Automated Guided Vehicle, AGV for short) is used to replace conventional manual handling to reduce manpower, the automated guided vehicle still needs manual operation during loading and unloading, and therefore, there is still a need for manpower, and it is difficult to avoid a problem such as dropping or collision of batteries when the batteries are loaded and unloaded manually. Safety of the battery during handling still needs to be improved. In addition, in order to avoid battery damage caused due to direct contact of a fork of the automated guided vehicle with the battery, the fork of the automated guided vehicle cannot directly handle the battery due to small sizes of some batteries, and therefore, the battery is usually placed in the battery tray, and then the fork of the automated guided vehicle handles the battery tray. Therefore, how the battery tray is removed from the storage pallet via the fork automatically and smoothly has become a research focus of the inventor.

Based on the foregoing considerations, the inventor has designed a storage pallet through in-depth research. The storage pallet includes two bracket arms, and an avoidance region is defined by the two bracket arms, so that the fork of the automated guided vehicle may be beneath a bottom of the battery tray and stably place the battery tray on the bracket arms on two sides of the avoidance region. In addition, the fork beneath the bottom of the battery tray is located in the avoidance region, contact between the battery tray and the bracket arms causes no impact, and therefore, after the battery tray is reliably placed on the bracket arms, the fork can leave the avoidance region without any impact on the battery tray, so that the battery tray can be unloaded onto the storage pallet via the fork automatically and smoothly, and similarly, the battery tray can be removed from the storage pallet via the fork through a reverse motion. Therefore, manpower can be saved, and the safety of the battery during handling can be effectively improved, which facilitates production and research and development of the battery.

In addition, the storage pallet being disposed in the foregoing shape requires no complex design for the battery tray. For example, it is not necessary to thicken the bottom of the battery tray to provide holes in the thickened bottom for the fork to enter, which can simplify a design of the battery tray. For example, the bottom of the battery tray can be directly provided as a flat plate structure or as a profiled plate having a groove with a bulge protruding upward and an opening facing downward, thereby simplifying the structure of the battery tray and reducing production costs of the battery tray.

It should be noted that an application scenario of the storage pallet in this embodiment is not limited. For example, the storage pallet may be used for the automated guided vehicle to serve as a buffer pallet for the automated guided vehicle, but the application scenario is not limited thereto. For another example, the storage pallet may alternatively be provided as a fixed pallet used in the field. In addition, the storage pallet in this embodiment is not exclusively used for storage of batteries, and can certainly be used for storage of other commodities, which is not limited herein. However, to simplify description, the storage pallet being only used for the storage of the battery is used as an example for illustration below.

Next, referring to the accompanying drawing, a storage pallet 1 according to an embodiment of this application is described.

Figure 2:
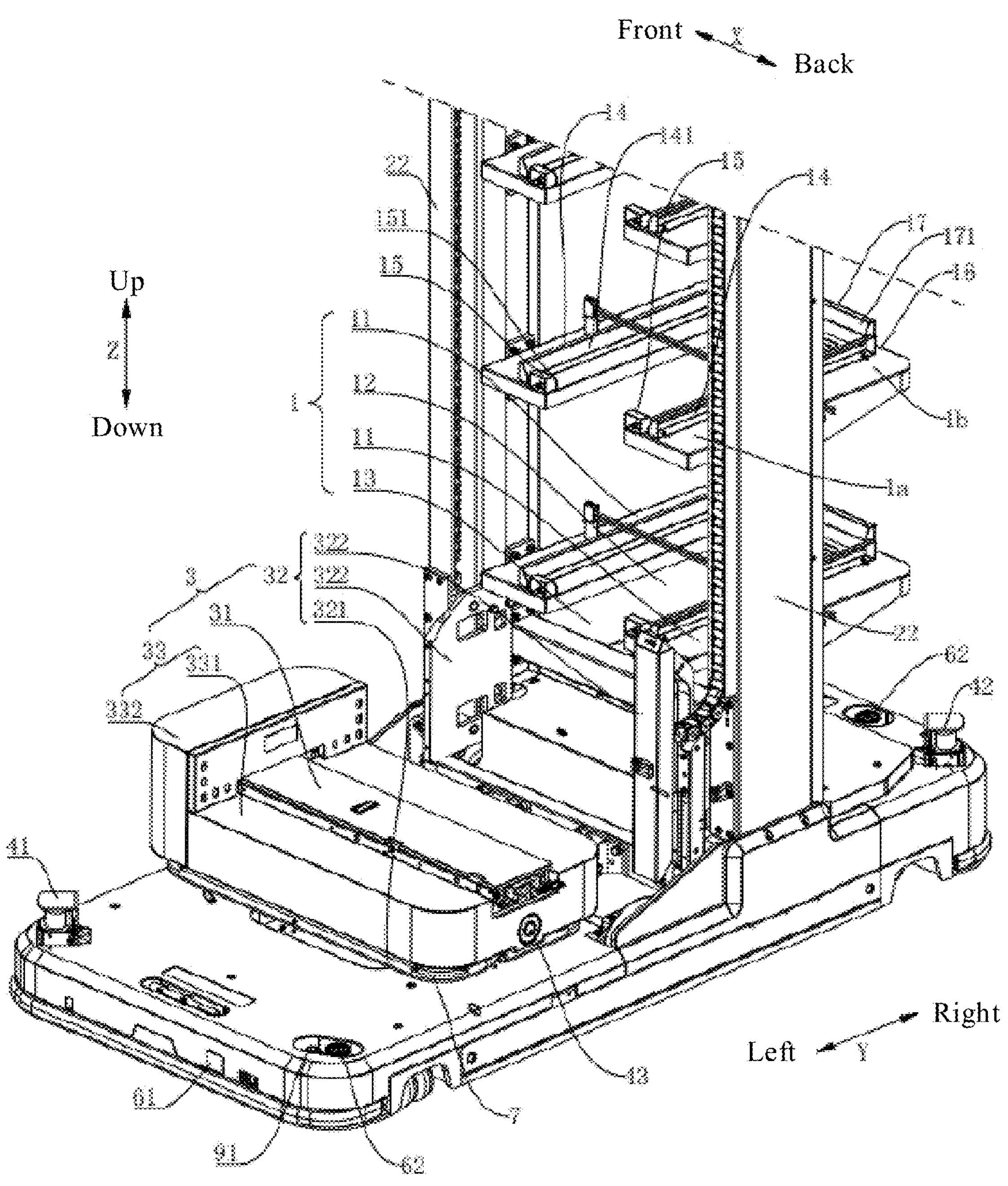
FIG. 2 is a partially enlarged diagram of the automated guided vehicle shown in FIG. 1.

As shown in FIG. 1 and FIG. 2, the storage pallet 1 includes bracket arms 11, two bracket arms 11 are provided and spaced apart along a first direction X to define an avoidance region 12 between the two bracket arms 11, two ends of the bracket arm 11 in a second direction Y are respectively a first end 1*a* and a second end 1*b*, the second direction Y is orthogonal to the first direction X, and first ends 1*a* of the two bracket arms 11 are not connected, so as to define, between the two first ends 1*a*, an opening 13 communicating with the avoidance region 12.

It should be noted that when the storage pallet 1 is in use, both the first direction X and the second direction Y extend along a horizontal direction or roughly extend along the horizontal direction, and therefore, when the storage pallet 1 is in use, the avoidance region 12 defined between the two bracket arms 11 is open in a vertical direction, or in other words, the avoidance region 12 extends through the storage pallet 1 along the vertical direction Z. In addition, the opening 13 formed between the two first ends 1*a* ensures that a side of the avoidance region 12 in the horizontal direction is also open.

In addition, the first direction X is orthogonal to the second direction Y, and therefore, it indicates that the second direction Y is perpendicular to the first direction X. However, specific directions of the first direction X and the second direction Y are not limited. For example, when the first direction X is a length direction of the storage pallet 1, the second direction Y may be a width direction of the storage pallet 1. For another example, when the first direction X is the width direction of the storage pallet 1, the second direction Y may be the length direction of the storage pallet 1.

It should be noted that the two ends of the bracket arm 11 in the second direction Y are respectively the first end 1*a* and the second end 1*b*, indicating that the first end 1*a* and the second end 1*b* are disposed in sequence along the second direction Y. However, the bracket arm 11 is not required to extend along the second direction Y. That is, an extension direction of a connecting line of the first end 1*a* and the second end 1*b* is not limited to the second direction Y, and may be, for example, the second direction Y or a direction inclined to the second direction Y.

In the foregoing technical solution, the avoidance region 12 is formed between the two bracket arms 11 of the storage pallet 1, so that the fork 31 of the automated guided vehicle 100 can be beneath a bottom of the battery tray 300 and stably place the battery tray 300 on the bracket arms 11 on two sides of the avoidance region 12. In addition, the fork 31 beneath the bottom of the battery tray 300 can penetrate through the opening 13 and be located in the avoidance region 12, to prevent contact between the battery tray 300 and the bracket arms 11 from causing any impact, and therefore, after the battery tray 300 is reliably placed on the bracket arms 11 (for example, an effect of placing a battery 200 on the storage pallet 1 via the pallet 300 can be learned from FIG. 7), the fork 31 can leave the opening 13 or the bottom of the avoidance region 12 without any impact on the battery tray 300, so that the battery tray 300 can be unloaded onto the storage pallet 1 via the fork 31 automatically and smoothly, and similarly, the battery tray 300 can be removed from the storage pallet 1 via the fork 31 through a reverse motion.

Therefore, the safety of the battery 200 during handling can be improved, which facilitates production and research and development of the battery 200. In addition, manpower can be saved, efficiency of production, research and development, testing, and the like can be increased, and costs of the production, research and development, testing, and the like can be reduced.

In addition, the storage pallet 1 is set into the foregoing shape, and therefore, no complex design is required for the battery tray 300. For example, it is not necessary to thicken the bottom of the battery tray 300 to provide holes in the thickened bottom for the fork 31 to enter, which can simplify a design of the battery tray 300. For example, the bottom of the battery tray 300 can be directly provided as a flat plate structure or as a profiled plate having a groove with a bulge protruding upward and an opening facing downward, thereby simplifying the structure of the battery tray 300 and reducing production costs of the battery tray 300.

Figure 3:
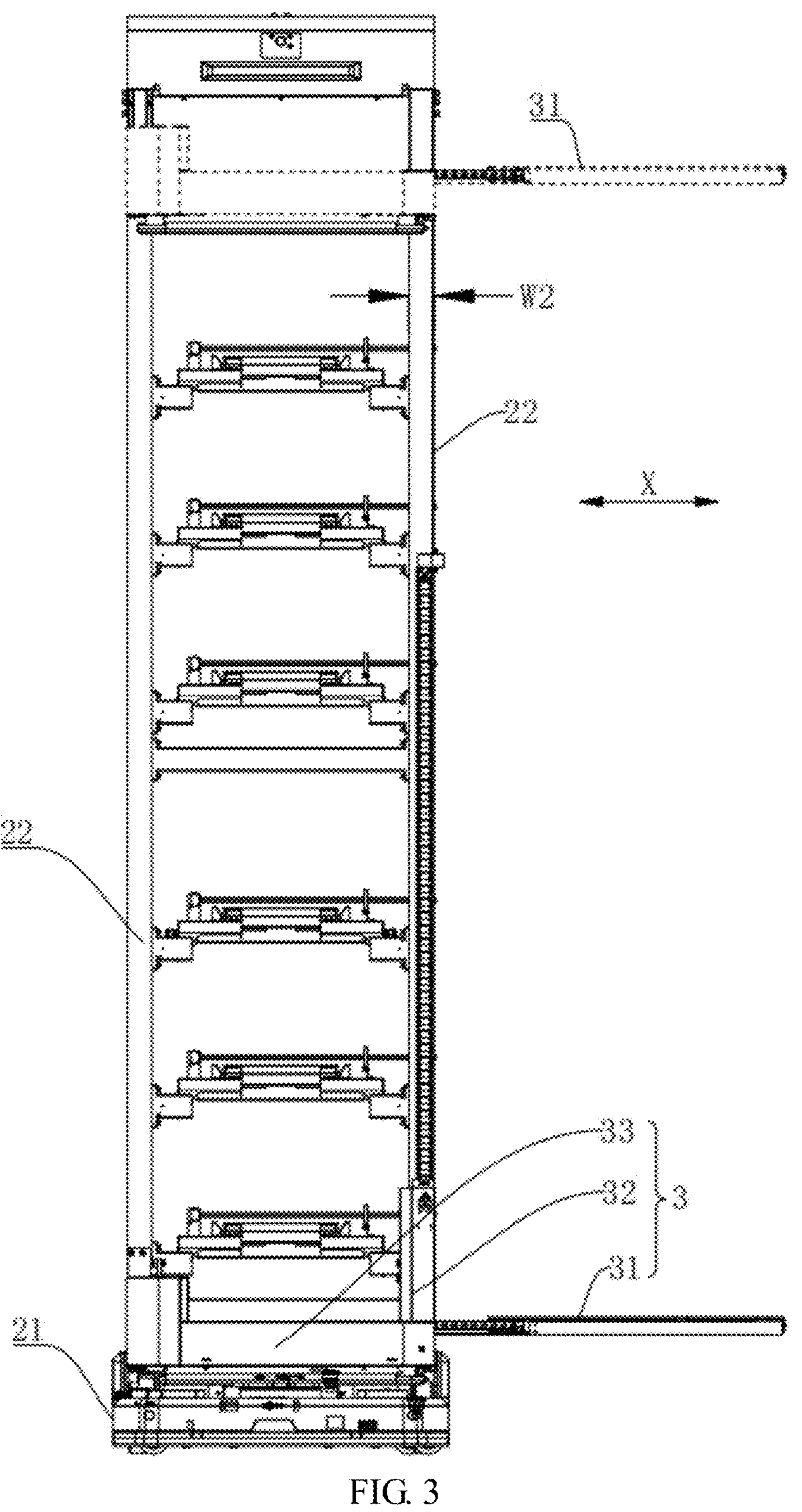
FIG. 3 is a schematic diagram of orthographic projection of the automated guided vehicle shown in FIG. 1.
Figure 4:
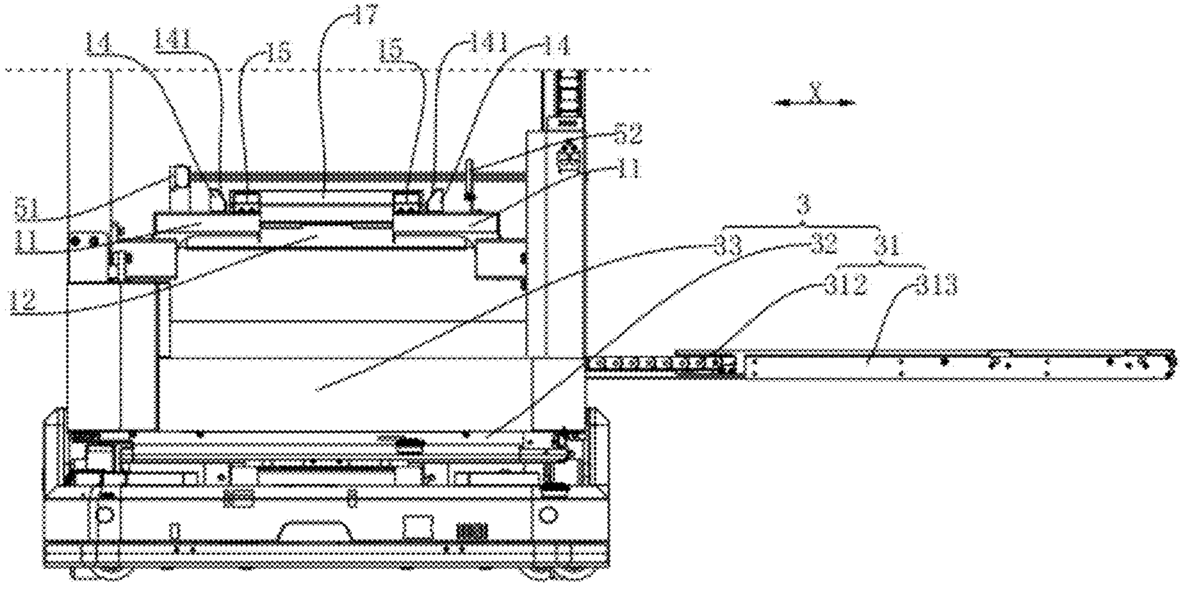
FIG. 4 is a partially enlarged diagram of the automated guided vehicle shown in FIG. 3.

In some embodiments, as shown in FIG. 2 to FIG. 4, a first stop member 14 is disposed on a top of at least one bracket arm 11, the bracket arm 11 has a portion on a side, facing the avoidance region 12, of the first stop member 14 to support a commodity, that is, a support region of the bracket arm 11 is on the side, facing the avoidance region 12, of the first stop member 14, and the first stop member 14 is configured to stop the commodity from exceeding the first stop member 14 along the first direction X and leaving the avoidance region 12.

It should be noted that the support region is a region for supporting the commodity in the bracket arm 11. For example, the battery tray 300 can be placed on the support region. However, the bracket arm 11 may directly support the battery tray 300 or indirectly support the battery tray 300. For example, a gasket may be disposed in the support region to indirectly support the battery tray 300 through the gasket.

Therefore, the first stop member 14 is disposed on the top of the bracket arm 11, which can prevent the battery tray 300 from leaving the support region of the bracket arm 11 along the first direction X, thereby better protecting the battery 200. When the first stop member 14 is disposed on a top of each bracket arm 11, which can effectively prevent the battery tray 300 from leaving support regions on two sides of the avoidance region 12 along the first direction X, thereby better protecting the battery 200.

In some embodiments, as shown in FIG. 2 and FIG. 4, a surface, facing the avoidance region 12, of the first stop member 14 forms a first guide surface 141, and the first guide surface 141 is inclined from top to bottom in a direction approaching the avoidance region 12. Therefore, when the battery tray 300 is placed into the support region from top to bottom, an unloading accuracy requirement of the battery tray 300 can be reduced, unloading efficiency can be improved, and a risk of damaging the battery 200 because the first stop member 14 collides with the battery tray 300 can be reduced, to further improve the safety of the battery 200 during handling.

In some embodiments, as shown in FIG. 2 and FIG. 4, the first stop member 14 extends along the second direction Y, and length of the first stop member 14 along the second direction Y is greater than or equal to length of the avoidance region 12 along the second direction Y.

Therefore, the first stop member 14 is provided as a bar-shaped structure extending along the second direction Y, which can simplify the structure of the first stop member 14, facilitate processing and assembly of the first stop member 14, improve production efficiency of the storage pallet 1, and reduce costs of the storage pallet 1. In addition, the first stop member 14 can have a better stop effect on battery trays 300 of different standards within a larger length range, thereby improving a protection effect on the battery 200.

Certainly, this application is not limited thereto. Alternatively, a plurality of first stop members 14 maybe spaced apart along the second direction Y, and so on. Details are not described herein.

In some embodiments, a mounting position of the first stop member 14 relative to the pallet is adjustable along the first direction X. Therefore, when the battery trays 300 have various dimensions along the first direction X, the mounting position of the first stop member 14 can be adjusted, thereby improving adaptability of the storage pallet 1.

It should be noted that a method of implementing adjustability of the mounting position of the first stop member 14 relative to the bracket arm 11 along the first direction X is not limited. For example, in some solutions, a plurality of first mounting positions may be disposed on the bracket arm 11 along the first direction X, and therefore, the first stop member 14 can be selectively mounted at any first mounting position, thereby adjusting the position of the first stop member 14. Alternatively, for another example, in some other solutions, a first adjustment apparatus may be disposed on the bracket arm 11, the first stop member 14 is connected to the bracket arm 11 through the first adjustment apparatus, and under drive of the first adjustment apparatus, the position of the first stop member 14 along the first direction X can be adjusted. For example, the first adjustment apparatus may include a drive motor and a transmission mechanism, and the transmission mechanism may include a rack and pinion mechanism, a worm gear mechanism, a pulley mechanism, or the like. Details are not described herein.

Figure 5:
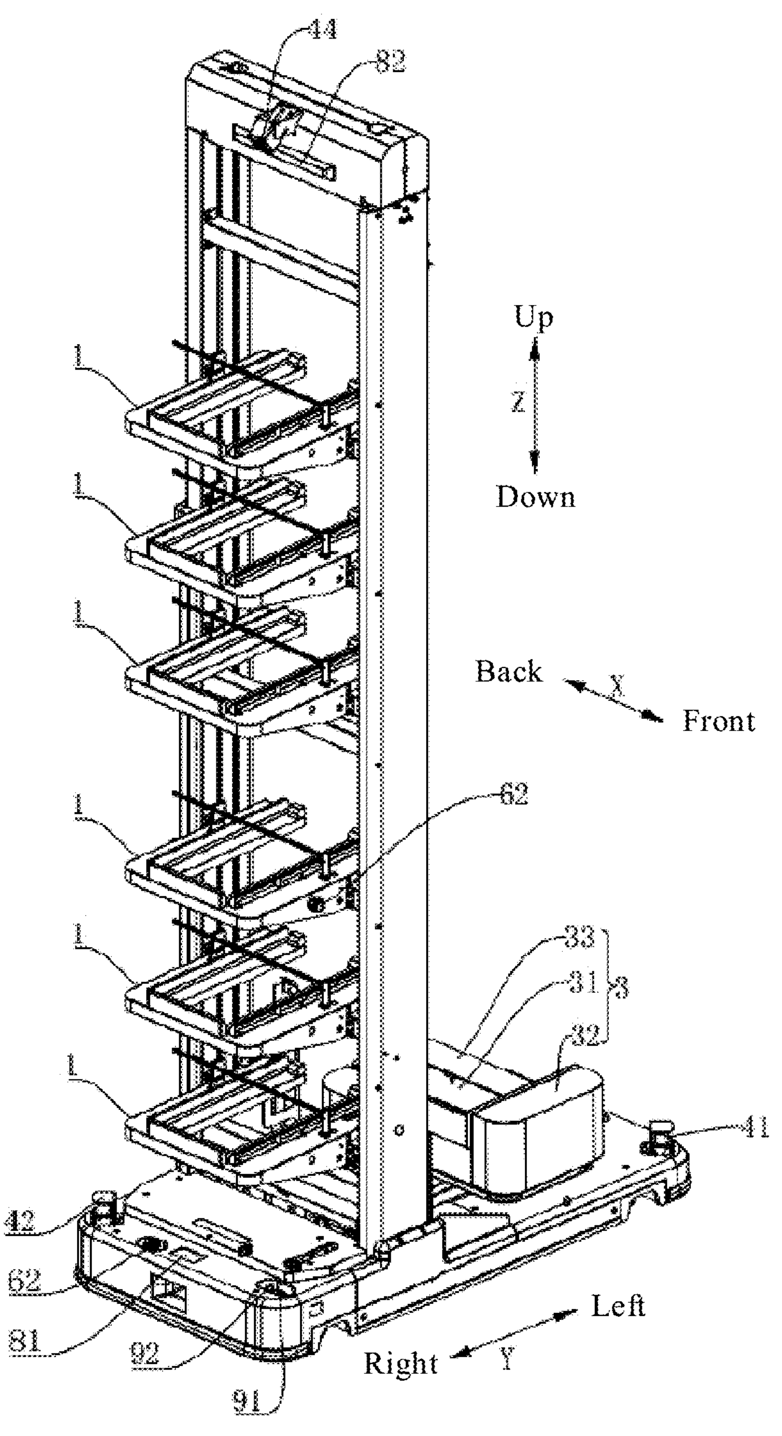
FIG. 5 is a three-dimensional diagram of another angle of the automated guided vehicle shown in FIG. 1.
Figure 6:
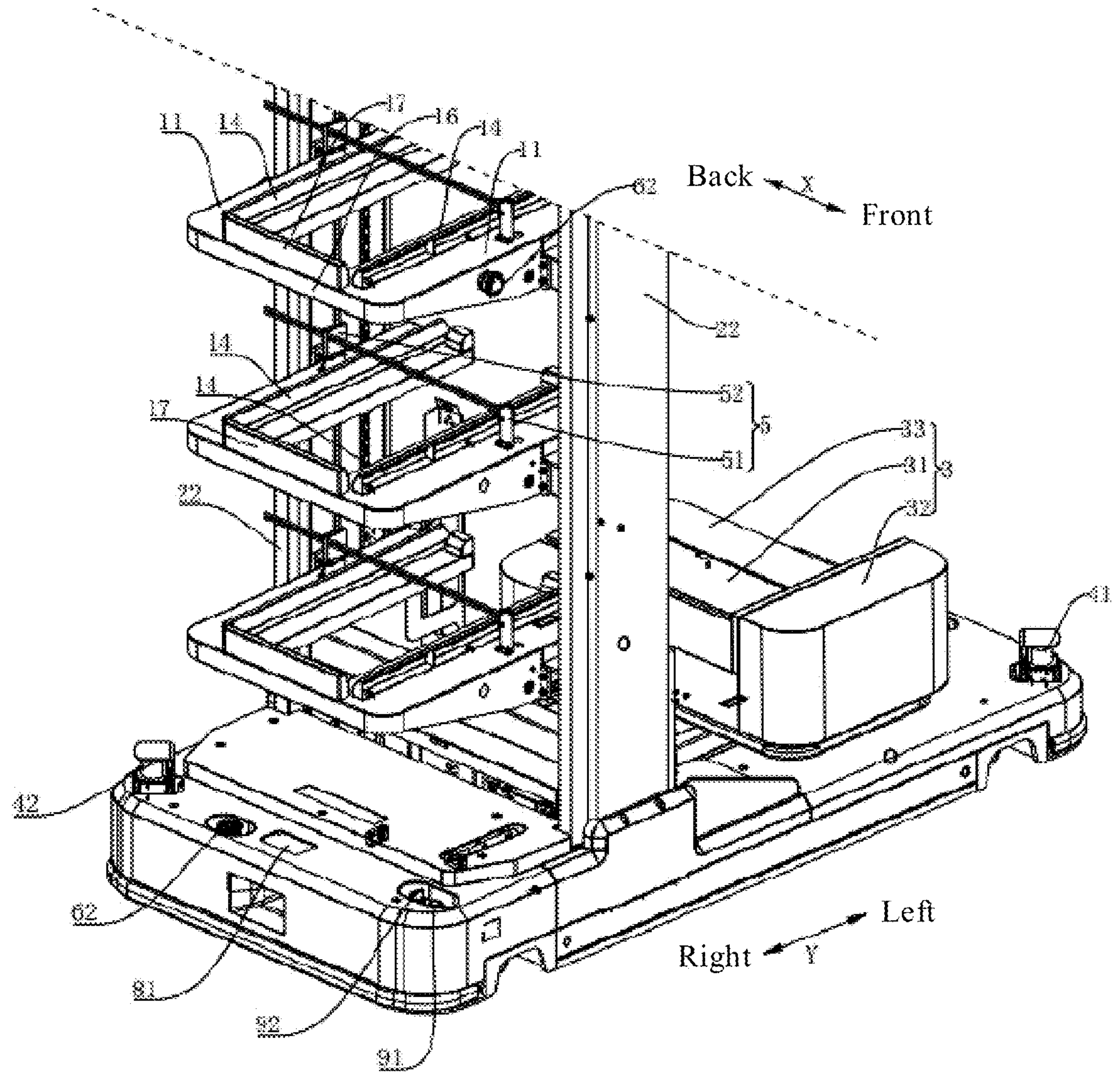
FIG. 6 is a partially enlarged diagram of the automated guided vehicle shown in FIG. 5.

In some embodiments, as shown in FIG. 5 and FIG. 6, a detector 5 for detecting the commodity is disposed on the top of the bracket arm 11, and therefore, the detector 5 can be configured to detect whether the commodity is placed on the bracket arm 11 or whether there is the commodity placed on the bracket arm 11, and so on, thereby improving reliability and accuracy of picking up and placing the commodity. It should be noted that, in this embodiment, a type and composition of the detector 5 are not limited. For example, the detection may be implemented through acoustic wave, a beam, image collection, and the like.

In some embodiments, as shown in FIG. 5 and FIG. 6, when the detector 5 and the first stop member 14 are disposed on the top of the bracket arm 11, and the detector 5 may be disposed on a side of the first stop member 14 farther away from the avoidance region 12 in the first direction X. Therefore, the detector 5 is disposed on the side of the first stop member 14 farther away from the avoidance region 12 in the first direction X, which can prevent the detector 5 from interfering with, affecting, or colliding with the commodity, thereby improving safety of picking up and placing the commodity.

In some embodiments, as shown in FIG. 5 and FIG. 6, when the detector 5 is disposed on the top of the bracket arm 11, the detector 5 can include an emitting end 51 and a receiving end 52 disposed opposite each other along the first direction X, the emitting end 51 and the receiving end 52 are respectively disposed on tops of the two bracket arms 11, and the receiving end 52 is configured to receive a beam emitted by the emitting end 51. That is, the emitting end 51 is disposed on one bracket arm 11, and the receiving end 52 is disposed on the other bracket arm 11. The emitting end 51 can emit a beam along the first direction X, and the receiving end 52 can detect the beam, to sense whether the commodity is placed on the bracket arm 11 or whether there is the commodity placed on the bracket arm 11, and so on.

Therefore, detection can be implemented easily and reliably, and accuracy of detection can be improved. In addition, when the first stop members 14 are disposed on the two bracket arms 11, the emitting end 51 and the receiving end 52 are respectively on the side of the first stop member 14 farther away from the avoidance region 12 on the bracket arm 11, which prevents the detector 5 from interfering with, affecting, or colliding with the commodity, thereby improving safety of picking up and placing the commodity.

In some embodiments, the first stop member 14 and the bracket arm 11 may be detachably connected, so that the first stop member 14 can be replaced with a different first stop member 14 or the first stop member 14 can be removed as required. For example, height of the first stop member 14 in the vertical direction Z is not limited, and a first stop member 14 of different height may be disposed based on a specific commodity condition. For example, when the commodity has greater height, a higher first stop member 14 maybe disposed, thereby improving storage safety of the commodity; or when the commodity has smaller height, a lower first stop member 14 maybe disposed, thereby reducing costs.

However, this application is not limited thereto. Alternatively, the first stop member 14 and the bracket arm 11 maybe integrally formed. In addition, it should be noted that the first stop member 14 maybe one member, or may be formed by a plurality of members. This is not limited herein. For example, when the first stop member 14 has greater height, the first stop member 14 being formed by the plurality of members can be selected.

In some embodiments, as shown in FIG. 2 and FIG. 6, a second stop member 15 is disposed on a top of a first end 1*a* of at least one bracket arm 11, and the second stop member 15 is configured to stop the commodity from exceeding the second stop member 15 along a direction from the second end 1*b* to the first end 1*a*.

Therefore, the second stop member 15 is disposed on a top of a first end 1*a* of the bracket arm 11, which can prevent the battery tray 300 from leaving the bracket arm 11 along the direction from the second end 1*b* to the first end 1*a*, thereby better protecting the battery 200. When the second stop member 15 is disposed on a top of each bracket arm 11, which can effectively prevent the battery tray 300 from leaving the two bracket arms 11 along the direction from the second end 1*b* to the first end 1*a*, thereby better protecting the battery 200.

In some embodiments, as shown in FIG. 2 and FIG. 6, a surface, facing the second end 1*b*, of the second stop member 15 forms a second guide surface 151, and the second guide surface 151 is inclined from top to bottom in a direction approaching the second end 1*b*.

Therefore, when the battery tray 300 is placed on the bracket arm 11 from top to bottom, an unloading accuracy requirement of the battery tray 300 can be reduced, unloading efficiency can be improved, and a risk of damaging the battery 200 because the second stop member 15 collides with the battery tray 300 can be reduced, to further improve the safety of the battery 200 during handling.

In some embodiments, the second stop member 15 and the bracket arm 11 may be detachably connected, so that the second stop member 15 can be replaced with a different second stop member 15 or the second stop member 15 can be removed as required. For example, when the commodity has greater height, the second stop member 15 can be removed, thereby improving ease of storing the commodity. However, this application is not limited thereto. Alternatively, the second stop member 15 and the bracket arm 11 maybe integrally formed.

In some embodiments, as shown in FIG. 2 and FIG. 6, the storage pallet 1 further includes a connecting arm 16, and the connecting arm 16 is connected to second ends 1*b* of the two bracket arms 11. Therefore, disposition of the connecting arm 16 can improve overall structure strength of the storage pallet 1, thereby improving the storage safety of the commodity. In addition, when the commodity has a great dimension in the second direction Y, the connecting arm 16 may alternatively be configured to support a part of the commodity, to disperse force on the storage pallet 1, thereby improving reliability and safety of supporting the commodity by the storage pallet 1.

In some embodiments, the connecting arm 16 and the bracket arm 11 are integrally formed members. In the foregoing technical solution, the storage pallet 1 is convenient to process, and overall structure strength of the storage pallet 1 can be better improved, thereby further improving the storage safety of the commodity. Certainly, this application is not limited thereto. In another embodiment, the connecting arm 16 and the bracket arm 11 may alternatively be configured as separate members, and assembled and connected.

In some embodiments, as shown in FIG. 2 and FIG. 6, a third stop member 17 is disposed on a top of the connecting arm 16, and the third stop member 17 is configured to stop the commodity from exceeding the third stop member 17 along a direction from the first end 1*a* to the second end 1*b*. Therefore, the third stop member 17 is disposed on the top of the connecting arm 16, which can prevent the battery tray 300 from leaving the storage pallet 1 along the direction from the first end 1*a* to the second end 1*b*, thereby better protecting the battery 200.

In some embodiments, as shown in FIG. 2 and FIG. 6, a surface, facing the avoidance region 12, of the third stop member 17 forms a third guide surface 171, the third guide surface 171 is inclined from top to bottom in a direction approaching the avoidance region 12. Therefore, when the battery tray 300 is placed on the bracket arm 11 from top to bottom, an unloading accuracy requirement of the battery tray 300 can be reduced, unloading efficiency can be improved, and a risk of damaging the battery 200 because the third stop member 17 collides with the battery tray 300 can be reduced, to further improve the safety of the battery 200 during handling.

In some embodiments, as shown in FIG. 2 and FIG. 6, the third stop member 17 extends along the first direction X, and length of the third stop member 17 along the first direction X is greater than or equal to length of the avoidance region 12 along the first direction X.

Therefore, the third stop member 17 is provided as a bar-shaped structure extending along the first direction X, which can simplify a structure of the third stop member 17, facilitate processing and assembly of the third stop member 17, improve production efficiency of the storage pallet 1, and reduce costs of the storage pallet 1. In addition, the third stop member 17 can have a better stop effect on battery trays 300 of different standards within a larger length range, thereby improving a protection effect on the battery 200.

Certainly, this application is not limited thereto. Alternatively, a plurality of third stop members 17 can be spaced apart along the first direction X, and so on. Details are not described herein.

In some embodiments, a mounting position of the third stop member 17 relative to the connecting arm 16 is adjustable along the second direction Y. Therefore, when the battery trays 300 have various dimensions along the second direction Y, the mounting position of the third stop member 17 can be adjusted, thereby improving adaptability of the storage pallet 1.

It should be noted that a method of implementing adjustability of the mounting position of the third stop member 17 relative to the connecting arm 16 along the second direction Y is not limited. For example, in some solutions, a plurality of second mounting positions may be disposed on the connecting arm 16 along the second direction Y, and therefore, the third stop member 17 can be selectively mounted at any second mounting position, thereby adjusting the position of the third stop member 17. Alternatively, for another example, in some other solutions, a second adjustment apparatus may be disposed on the connecting arm 16, the third stop member 17 is connected to the connecting arm 16 through the second adjustment apparatus, and under drive of the second adjustment apparatus, the position of the third stop member 17 along the second direction Y can be adjusted. For example, the second adjustment apparatus may include a drive motor and a transmission mechanism, and the transmission mechanism may include a rack and pinion mechanism, a worm gear mechanism, a pulley mechanism, or the like. Details are not described herein.

In some embodiments, the third stop member 17 and the connecting arm 16 may be detachably connected, so that the third stop member 17 can be replaced with a different third stop member 17 or the third stop member 17 can be removed as required. For example, height of the third stop member 17 in the vertical direction Z is not limited, and a third stop member 17 of different height may be disposed based on a specific commodity condition. For example, when the commodity has greater height, a higher third stop member 17 maybe disposed, thereby improving storage safety of the commodity; or when the commodity has smaller height, a lower third stop member 17 maybe disposed, thereby reducing costs.

However, this application is not limited thereto. Alternatively, the third stop member 17 and the connecting arm 16 maybe integrally formed. In addition, it should be noted that the third stop member 17 maybe one member, or may be formed by a plurality of members. This is not limited herein. For example, when the third stop member 17 has greater height, the plurality of members can be selected to be combined into the third stop member 17.

As described above, an application scenario of the storage pallet 1 in this embodiment of this application is not limited. For example, the storage pallet can be used for the automated guided vehicle 100 to serve as a buffer pallet for the automated guided vehicle 100. Therefore, this application further proposes an automated guided vehicle 100. Next, referring to the accompanying drawing, the automated guided vehicle 100 in this embodiment of this application is described.

Figure 10:
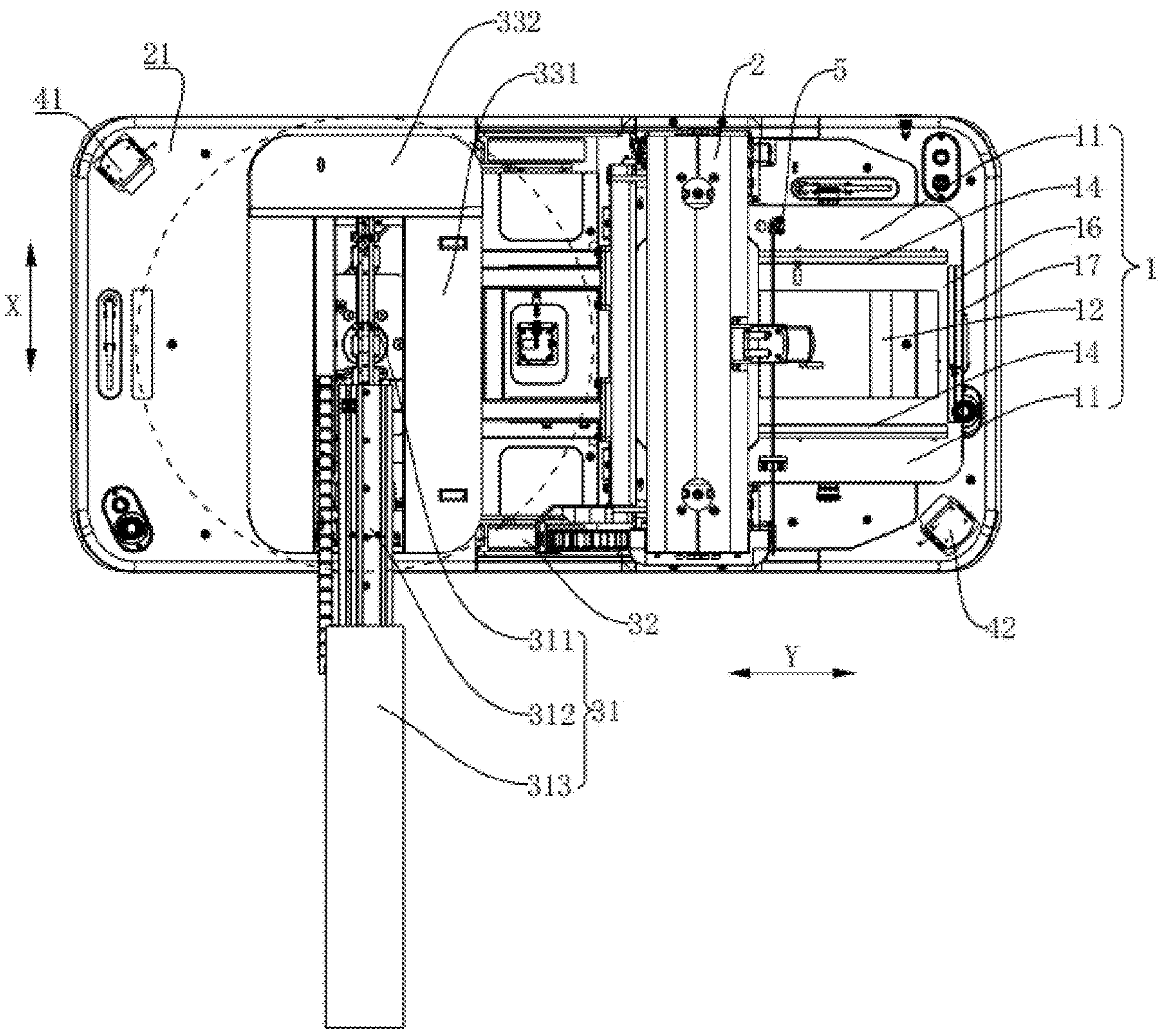
FIG. 10 is a use state diagram of the automated guided vehicle shown in FIG. 9.

As shown in FIG. 1, the automated guided vehicle 100 includes: a rack body 2, a pick-and-place assembly 3, and the foregoing storage pallet 1. The rack body 2 includes a chassis 21 and a vertical frame 22 disposed on the chassis 21, the vertical frame 22 is provided with a plurality of storage pallets 1 spaced apart along a vertical direction Z, two sides of the vertical frame 22 in the second direction Y are respectively a first side and a second side, and each storage pallet 1 is on a second side of the vertical frame 22. The pick-and-place assembly 3 is connected to the rack body 2, and can be lifted and rotated on a first side of the vertical frame 22 (for example, a lifted state of the pick-and-place assembly 3 denoted by a dashed line in FIG. 3 and FIG. 8, and a lowered state of the pick-and-place assembly 3 denoted by a solid line; and for example, a dashed round region shown in FIG. 10 is a rotatable range of the pick-and-place assembly 3). The pick-and-place assembly 3 includes a telescopic fork 31, and the avoidance region 12 is configured to avoid the fork 31 when the fork 31 picks or places a commodity from or onto the storage pallet 1.

For example, when the automated guided vehicle 100 needs to pick up the battery 200 from a specified position, the pick-and-place assembly 3 is rotated relative to the rack body 2 to reach a position where the fork 31 is telescopic along the first direction X, and the pick-and-place assembly 3 is lifted or lowered, so that the fork 31 is aligned with the battery 200 to be picked up at the specified position. Then the fork 31 is extended to a bottom of the battery tray 300, the fork 31 retracts after lifting a pallet of the battery 200, and then the pick-and-place assembly 3 is rotated relative to the rack body 2 until the fork 31 is telescopic towards the storage pallet 1. The pick-and-place assembly 3 is lifted or lowered so that the fork 31 is aligned with the target storage pallet 1, and then the fork 31 is extended to the target storage pallet 1, so that the battery tray 300 lands on the target storage pallet 1 and the fork 31 is located in the avoidance region 12 of the target storage pallet 1, and then the fork 31 can be retracted.

For another example, when the automated guided vehicle 100 needs to pick up the battery 200 from the target storage pallet 1, the pick-and-place assembly 3 is rotated relative to the rack body 2 until the fork 31 is telescopic towards the storage pallet 1, the pick-and-place assembly 3 is lifted or lowered so that the fork 31 is aligned with the target storage pallet 1, then the fork 31 is extended to the target storage pallet 1, and the fork 31 is extended to the avoidance region 12 of the target storage pallet 1, and lifts the battery tray 300 up from backstop of the storage pallet 1. Then the fork 31 can retract while carrying the battery tray 300, and then the pick-and-place assembly 3 is rotated relative to the rack body 2 to reach a specified angular position, so that the battery 200 carried on the fork 31 can be delivered subsequently.

Therefore, the pick-and-place assembly 3 is disposed to pick up and place the commodity, which effectively saves manpower and improves efficiency of picking up and placing the commodity. In addition, the foregoing storage pallet 1 is provided as the buffer pallet of the automated guided vehicle 100 to temporarily store the commodity, which can effectively improve safety in a process of picking up and placing the commodity.

It should be noted that a rotatable angular position of the pick-and-place assembly 3 is not limited, but the rotation range of the pick-and-place assembly 3 does not interfere with the rack body 2 or the storage pallet 1. That is, when the fork 31 is in the retracted state, regardless of which angle the pick-and-place assembly 3 is rotated to, the pick-and-place assembly 3 does not collide with the rack body 2 or the storage pallet 1. For example, in some embodiments, the pick-and-place assembly 3 can rotate within a range of 360° (for example, a dashed round region shown in FIG. 10 is a rotatable range of the pick-and-place assembly 3), which facilitates picking-up and placing of the commodity from a plurality of angles and increasing an applicable scenario of the automated guided vehicle 100.

Figure 9:
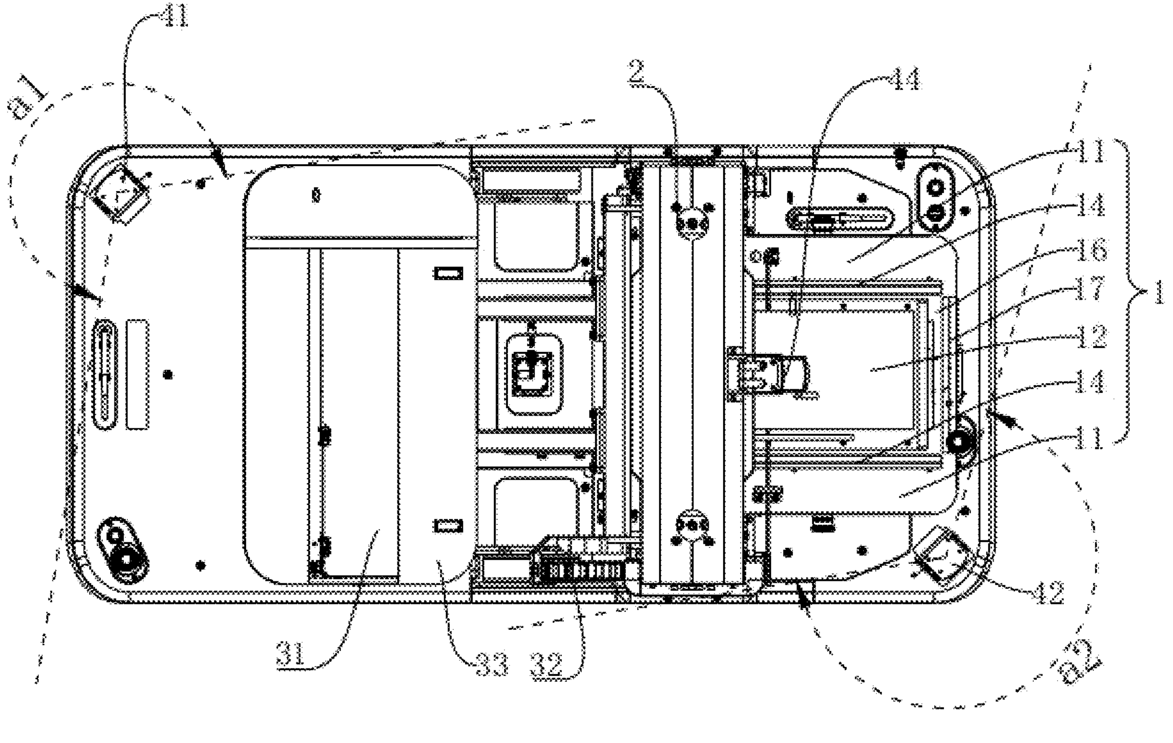
FIG. 9 is a schematic diagram of a top view of the automated guided vehicle shown in FIG. 7.

In some embodiments, as shown in FIG. 1, FIG. 5, and FIG. 9, the chassis 21 includes a first portion 211 and a second portion 212, the first portion 211 is on the first side of the vertical frame 22, the second portion 212 is on the second side of the vertical frame 22, an end, farther away from the vertical frame 22, of the first portion 211 is provided with a first obstacle avoidance apparatus 41, an end, farther away from the vertical frame 22, of the second portion 212 is provided with a second obstacle avoidance apparatus 42, and the first obstacle avoidance apparatus 41 and the second obstacle avoidance apparatus 42 are located at diagonal positions of the chassis 21. Therefore, the automated guided vehicle 100 can better avoid an obstacle in both the first direction X and the second direction Y, thereby improving safety of the battery 200 during handling. In addition, the quantity of avoidance apparatuses is small, which can reduce the costs.

In some embodiments, as shown in FIG. 1, the chassis 21 may not only include the first portion 211 and the second portion 212, but may also include a third portion 213 that connects the first portion 211 to the second portion 212 and that is located at the bottom of the vertical frame 22, so that the chassis 21 has a better load-bearing capability.

For example, the first direction X may be a front-to-back direction, the second direction Y may be a left-to-right direction, the first portion 211 is on the left side of the vertical frame 22, the second portion 212 is on the right side of the vertical frame 22, the first obstacle avoidance apparatus 41 is disposed at a left front corner of the first portion 211, and the second obstacle avoidance apparatus 42 is disposed at a right rear corner of the second portion 212, so that the first obstacle avoidance apparatus 41 and the second obstacle avoidance apparatus 42 can be located at diagonal positions. The first obstacle avoidance apparatus 41 can have sensing ranges toward the left side and the front side, so that the automated guided vehicle 100 can avoid obstacles on the left side and the front side. The second obstacle avoidance apparatus 42 can have sensing ranges on the right side and the rear side, so that the automated guided vehicle 100 can avoid obstacles on the right side and the rear side, thereby improving the safety of the battery 200 during handling.

It should be noted that specific types of the first obstacle avoidance apparatus 41 and the second obstacle avoidance apparatus 42 are not limited. For example, a laser may be used for obstacle avoidance, or obstacle avoidance may be implemented through image collection and the like. For example, in some specific embodiments, both the first obstacle avoidance apparatus 41 and the second obstacle avoidance apparatus 42 are LiDARs. With reference to FIG. 9, both scanning angle ranges (for example, an angle a1 and an angle a2 shown in FIG. 9) of the first obstacle avoidance apparatus 41 and the second obstacle avoidance apparatus 42 can reach approximately 240° to 250°, and a scanning radius can reach approximately 8 m, so that the automated guided vehicle 100 can better avoid the obstacle, thereby improving the safety of the battery 200 during handling.

In some embodiments, as shown in FIG. 1 and FIG. 5, the pick-and-place assembly 3 has a first vision apparatus 43, and a second vision apparatus 44 is present on a top of the vertical frame 22. Therefore, in the process of picking up and placing the commodity, the first vision apparatus 43 can be used for visual addressing, and the second vision apparatus 44 can be further used for reconfirmation, thereby improving the accuracy of picking up and placing the commodity.

A specific position of the first vision apparatus 43 on the pick-and-place assembly 3 is not limited. For example, the first vision apparatus 43 maybe disposed on a side from which the fork 31 of the first vision apparatus 43 extends, so that the first vision apparatus 43 can effectively perform visual addressing when an extension direction of the fork 31 is aligned with an orientation of the commodity. In addition, a deposition orientation of the second vision apparatus 44 on the top of the vertical frame 22 is not limited, and the second vision apparatus 44 may be fixed obliquely or may be movable. In addition, it should be noted that a specific composition of the first vision apparatus 43 and the second vision apparatus 44 is not limited. For example, the first vision apparatus 43 maybe a code reading camera, and the second vision apparatus 44 maybe a depth camera or the like. This is not limited herein.

In addition, when the first obstacle avoidance apparatus 41 and the second obstacle avoidance apparatus 42 are provided on the chassis 21, the second vision apparatus 44 may alternatively be configured to reconfirm the obstacle, to improve reliability of obstacle avoidance and improve the safety of the battery 200 during handling. Alternatively, when the first obstacle avoidance apparatus 41 or the second obstacle avoidance apparatus 42 is faulty, the second vision apparatus 44 is configured to detect the obstacle, thereby improving the safety of the battery 200 during handling.

Figure 7:
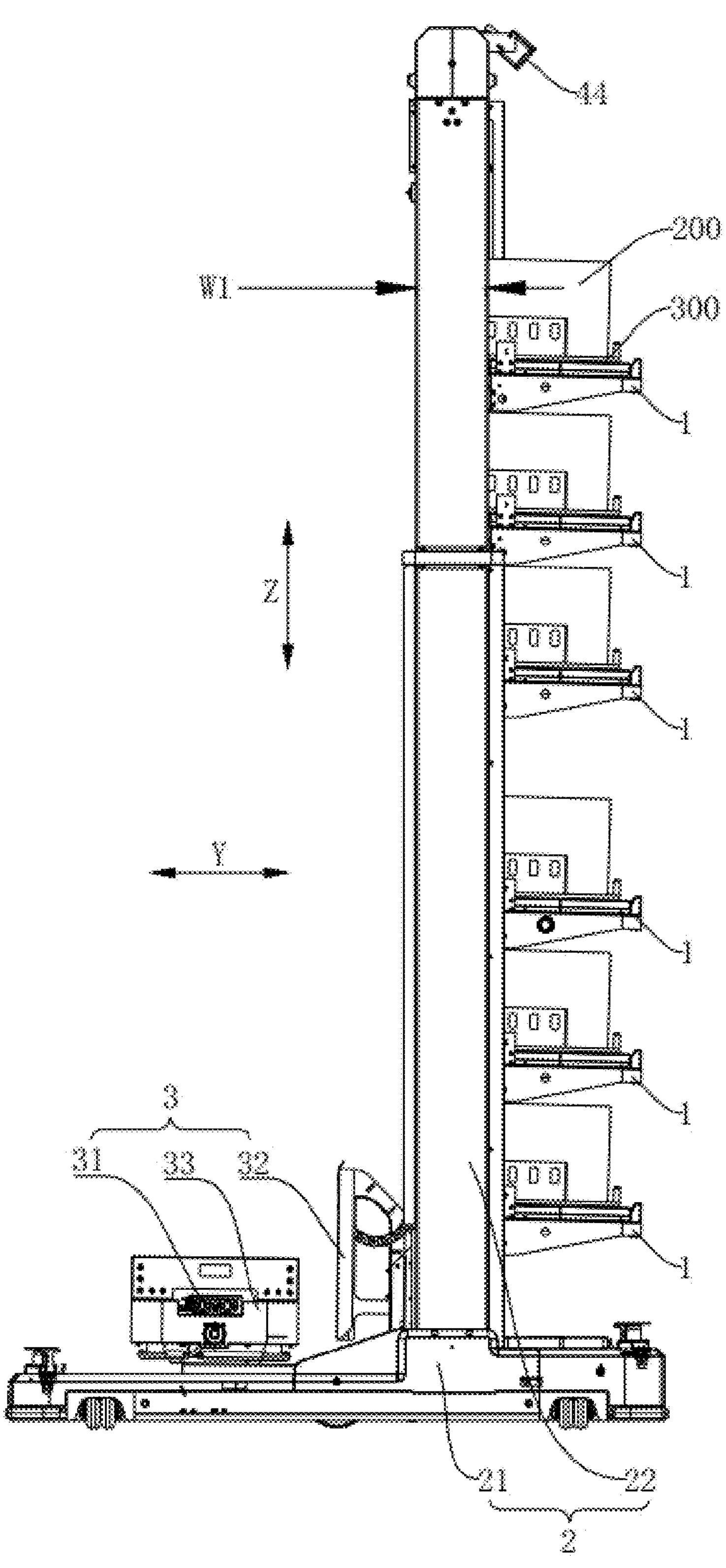
FIG. 7 is a use state diagram of the automated guided vehicle shown in FIG. 1.

In some embodiments, as shown in FIG. 5 and FIG. 7, at least six storage pallets 1 are provided. That is, there are six or more storage pallets 1 mounted on the vertical frame 22, for example, six, seven, or eight storage pallets 1, so that spatial utilization in the vertical direction Z can be improved and the automated guided vehicle 100 can carry more commodities; and therefore, total weight of the commodities that can be carried by the automated guided vehicle 100 is greater. Herein, a load-bearing capability of a single storage pallet 1 is not limited, for example, 1 kg to 50 kg. When the load-bearing capability of the single storage pallet 1 exceeds 9 kg, a total load-bearing capability of the automated guided vehicle 100 can exceed 50 kg.

In some embodiments, as shown in FIG. 5 and FIG. 7, a mounting position of the storage pallet 1 on the vertical frame 22 is adjustable along a vertical direction Z. Therefore, the mounting position of the storage pallet 1 along the vertical direction Z can be adjusted based on height of the commodity, so that each layer of storage pallet 1 can store the commodity, thereby improving an application scope of the automated guided vehicle 100 and improving the spatial utilization of the automated guided vehicle 100.

It should be noted that a method of implementing adjustability of the mounting position of the storage pallet 1 relative to the vertical frame 22 along the vertical direction Z is not limited. For example, in some solutions, a plurality of third mounting positions may be disposed on the vertical frame 22 along the vertical direction Z, and therefore, the storage pallet 1 can be selectively mounted at any third mounting position, thereby adjusting the position of the storage pallet 1. Alternatively, for another example, in some other solutions, a third adjustment apparatus may be disposed on the vertical frame 22, the storage pallet 1 is connected to the vertical frame 22 through the third adjustment apparatus, and under drive of the third adjustment apparatus, the position of the storage pallet 1 along the vertical direction Z can be adjusted. For example, the third adjustment apparatus may include a drive motor and a transmission mechanism, and the transmission mechanism may include a rack and pinion mechanism, a worm gear mechanism, a pulley mechanism, or the like. Details are not described herein.

In some embodiments, when at least six storage pallets 1 are provided and the mounting position of the storage pallet 1 on the vertical frame 22 is adjustable along the vertical direction Z, the spatial utilization of the automated guided vehicle 100 can be better improved, and the load-bearing capability and the application scope of the automated guided vehicle 100 are improved.

In some embodiments, as shown in FIG. 1 to FIG. 6, two vertical frames 22 are provided and spaced apart on two sides of the storage pallet 1 along the first direction X, and two bracket arms 11 of each storage pallet 1 are respectively connected to inner side walls of the vertical frame 22 on the two sides. Therefore, because there are two vertical frames 22 connected to outer sides of two bracket arms 11 of the storage pallet 1, the vertical frame 22 can have better support and protection effects on the storage pallet 1, thereby improving reliability and safety of supporting the commodity by the storage pallet 1 and improving the load-bearing capability of the automated guided vehicle 100.

Figure 8:
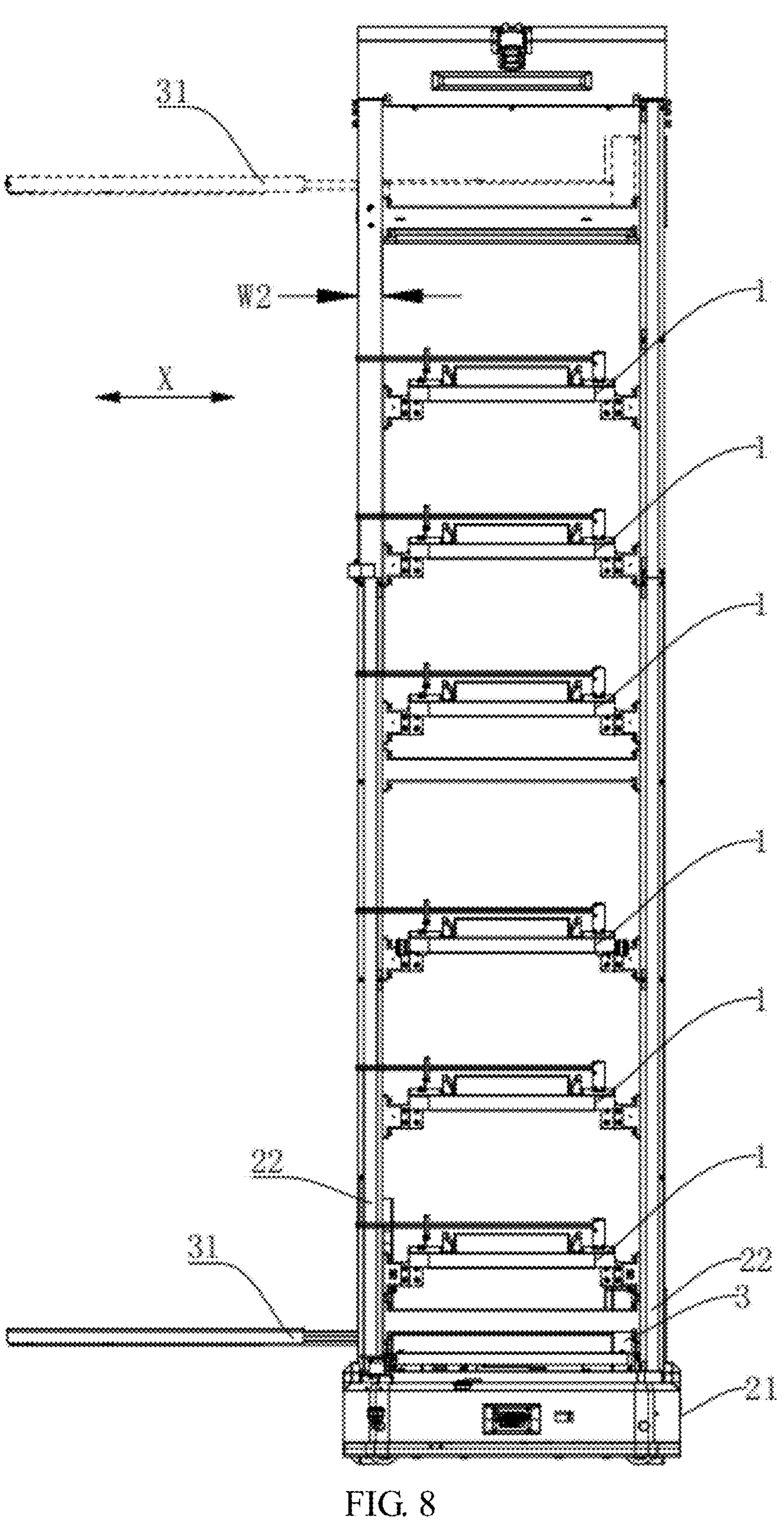
FIG. 8 is a schematic diagram of a right view of the automated guided vehicle shown in FIG. 7.

In some embodiments, as shown in FIG. 7 and FIG. 8, an outer side wall of the vertical frame 22 can be a solid plate and the vertical frame 22 has a dimension W1 in the second direction Y that is more than three times a dimension W2 of the vertical frame 22 in the first direction X. Therefore, counterweight of the vertical frame 22 can be improved, which facilitates improvement of a capability of supporting the storage pallet 1 by the bracket, thereby improving reliability and safety of supporting the commodity by the storage pallet 1 and improving the load-bearing capability of the automated guided vehicle 100.

In some embodiments, as shown in FIG. 2 and FIG. 6, the pick-and-place assembly 3 includes a lifting portion 32 and a rotating portion 33, and the lifting portion 32 cooperates with the rack body 2 to be liftable along the vertical frame 22. Herein, a cooperation method of the lifting portion 32 and the rack body 2 is not limited, and can be implemented via, for example, a chain mechanism, a pulley mechanism, or a rack and pinion mechanism, so that the lifting portion 32 moves up and down relative to the rack body 2 along the vertical frame 22.

In some embodiments, as shown in FIG. 2 and FIG. 6, the rotating portion 33 is rotatably connected to the lifting portion 32, to be synchronously lifted or lowered along with the lifting portion 32 and be rotatable around a vertical axis relative to the lifting portion 32. Therefore, the fork 31 is disposed on the rotating portion 33, thereby lifting and rotating the fork 31 simply and effectively.

It should be noted that a rotation axis of the rotating portion 33 is a rotation axis of the pick-and-place assembly 3, and the rotation axis extends along the vertical direction Z, so that the rotating portion 33 and the pick-and-place assembly 3 can rotate horizontally around the vertical axis. Herein, a rotation and connection solution of the rotating portion 33 and the lifting portion 32 is not limited. For example, the lifting portion 32 may include a bottom plate 321 beneath the rotating portion 33, the rotating portion 33 is above the bottom plate 321, and a rotation drive mechanism may be disposed on the bottom plate 321 to drive the rotating portion 33 to rotate.

In some embodiments, as shown in FIG. 2, the lifting portion 32 includes two fourth stop members 322 spaced apart along the first direction X, and a distance between the two fourth stop members 322 in the first direction X is greater than a dimension of the storage pallet 1 in the first direction X. Therefore, the lifting portion 32 does not collide with the storage pallet 1 in a lifting or lowering process, which can ensure the safety and reliability of supporting the commodity by the storage pallet 1. In addition, when the fork 31 handles the commodity to the storage pallet 1, a risk of falling of the commodity from the fork 31 can be reduced by using a limit function of the fourth stop member 322, thereby improving the safety of the commodity during handling.

In some embodiments, as shown in FIG. 2 and FIG. 6, the pick-and-place assembly 3 includes a rotating portion 33, the rotating portion 33 includes a main body 331 and a stop portion 332, the fork 31 is disposed on the main body 331 and protrudes from a top of the main body 331, the stop portion 332 is disposed on the main body 331 and protrudes from the top of the main body 331, and the stop portion 332 is on a side of the fork 31 along a retraction direction of the fork 31. For example, if the fork 31 is extended forward, the stop portion 332 is behind the fork 31. For another example, if the fork 31 is extended leftward, the stop portion 332 is on a right side of the fork 31.

Therefore, because the fork 31 is disposed on the main body 331 and protrudes from the top of the main body 331, when the fork 31 is retracted to pull the commodity back above the rotating portion 33, the rotating portion 33 can be prevented from colliding with the battery tray 300 and causing damage to the battery 200, and so on, thereby improving the safety of the battery 200 during handling. In addition, the stop portion 332 is disposed, so that when the fork 31 is retracted to pull the commodity back above the rotating portion 33, the stop portion 332 can prevent the risk of falling from the rotating portion 33 by the commodity along the retraction direction of the fork 31 due to a factor such as inertia, thereby further improving the safety of the battery 200 during handling.

In some embodiments, as shown in FIG. 9 and FIG. 10, the fork 31 includes a base portion 311, a first extension segment 312, and a second extension segment 313, the first extension segment 312 is telescopic relative to the base portion 311, and the second extension segment 313 is telescopic relative to the first extension segment 312. Therefore, the fork 31 is set in a telescopic form of at least two segments, so that the fork 31 can have a longer telescopic range, and the automated guided vehicle 100 has richer use scenarios and a wider application scope.

It should be noted that, specific composition of the automated guided vehicle 100 according to this embodiment of this application is not limited thereto. For example, a loudspeaker apparatus 61, an emergency stop apparatus 62, a pneumatic anti-collision apparatus 7, a display screen 81, indicator light 82, a reset apparatus 91, a power supply 92, a real-time data feedback system, and the like may also be disposed. For example, the real-time data feedback system can include a wireless uploading module connected to a vision apparatus, an obstacle avoidance apparatus, and the like. For example, data can be automatically uploaded. Herein, content of the data is not limited, and address system information, object information, storage location information, storage date information, and the like can be formed based on a program design.

Next, an automated guided vehicle 100 according to a specific embodiment of this application is described.

The automated guided vehicle 100 includes: a storage pallet 1, a rack body 2, and a pick-and-place assembly 3. The rack body 2 includes a chassis 21 and vertical frames 22, and there are two vertical frames 22 spaced apart along the first direction X. The pick-and-place assembly 3 is disposed on a left side of the vertical frame 22 in the second direction Y, and there are six storage pallets 1 that are spaced apart along the vertical direction Z and that are disposed on a right side of the vertical frame 22 in the second direction Y, so that a commodity can be placed on each layer of storage pallet 1, thereby making full use of space of the automated guided vehicle 100 and improving field utilization. Herein, a position of the storage pallet 1 relative to the vertical frame 22 along the vertical direction Z can be disposed to be adjustable, so as to be compatible with commodities of different volumes.

An electric cabinet is disposed on the chassis 21, which not only saves space, but also facilitates operation, troubleshooting and maintenance, thereby increasing counterweight of the chassis 21, improving a load-bearing capability of the storage pallet 1, providing a beneficial working environment for maintenance, and improving work efficiency. A first obstacle avoidance apparatus 41 and a second obstacle avoidance apparatus 42 are respectively disposed at diagonal ends of the chassis 21, a fork 31 and a code-reading camera are disposed on the pick-and-place assembly 3, and a depth camera is disposed on a top of the vertical frame 22. In a moving process of the automated guided vehicle 100, an identification angle of the depth camera can be approximately 30° to 60°, the depth camera can identify whether there is an obstacle within a range of 50 mm to 2000 mm ahead, and can reconfirm visual addressing of the code-reading camera, thereby effectively improving accuracy of obstacle avoidance and addressing.

It should be noted that, without conflict, the embodiments and features in the embodiments in this application may be combined.

The foregoing descriptions are merely exemplary embodiments of this application, but are not intended to limit this application. Persons skilled in the art understand that this application may have various modifications and variations. Any modifications, equivalent replacements, and improvements made without departing from the spirit and principle of this application shall fall within the protection scope of this application.

What is claimed is:

1. A storage pallet, comprising:

two bracket arms spaced apart along a first direction to form an avoidance region between the two bracket arms; and a connecting arm;

wherein:

each of the two bracket arms comprises a first end and a second end in a second direction orthogonal to the first direction, and the first ends of the two bracket arms are not connected, so as to form, between the two first ends, an opening communicating with the avoidance region;

a top surface of each of the two bracket arms is provided with a first stop member and a second stop member, and a distance between the second stop members of the two bracket arms is less than a distance between the first stop members of the two bracket arms, and the first stop members of the two bracket arms extend along the second direction;

the connecting arm is connected to the second ends of the two bracket arms; and a top surface of the connecting arm is provided with a third stop member, the third stop member extending along the first direction and connecting the first stop members of the two bracket arms.

2. The storage pallet according to claim 1, wherein each of the two bracket arms has a portion on a side, facing the avoidance region, of the first stop member to support a commodity, and the first stop member of each of the two bracket arms is configured to stop the commodity from exceeding the first stop member along the first direction.

3. The storage pallet according to claim 1, wherein a surface, facing the avoidance region, of the first stop member of each of the two bracket arms forms a guide surface, and the guide surface is inclined from top to bottom in a direction approaching the avoidance region.

4. The storage pallet according to claim 1, wherein a length of the first stop member of each of the two bracket arms along the second direction is greater than or equal to a length of the avoidance region along the second direction.

5. The storage pallet according to claim 1, wherein:

a mounting position of the first stop member of each of the two bracket arms relative to the each of the two bracket arms is adjustable along the first direction; and/or the first stop member of each of the two bracket arms is detachably connected to the each of the two bracket arms.

6. The storage pallet according to claim 1, wherein a detector for detecting the commodity is disposed on the top of each of the two bracket arms, and the detector is disposed on a side, extending away from the avoidance region in the first direction, of the first stop member of the each of the two bracket arms.

7. The storage pallet according to claim 1, wherein a detector for detecting the commodity is disposed on at least one of tops of the two bracket arms.

8. The storage pallet according to claim 7, wherein the detector comprises an emitting end and a receiving end disposed opposite each other along the first direction, the emitting end and the receiving end are respectively disposed on the two bracket arms, and the receiving end is configured to receive a beam emitted by the emitting end.

9. The storage pallet according to claim 1, wherein the second stop member of each of the two bracket arms is configured to stop the commodity from exceeding the second stop member along a direction from the second end to the first end.

10. The storage pallet according to claim 1, wherein a surface, facing the second end, of the second stop member of each of the two bracket arms forms a guide surface, and the guide surface is inclined from top to bottom in a direction approaching the second end.

11. The storage pallet according to claim 1, wherein the second stop member of each of the two bracket arms is detachably connected to the each of the two bracket arms.

12. The storage pallet according to claim 1, wherein the third stop member is configured to stop the commodity from exceeding the third stop member along a direction from the first end to the second end.

13. The storage pallet according to claim 1, wherein a surface, facing the avoidance region, of the third stop member forms a guide surface, and the guide surface is inclined from top to bottom in a direction approaching the first end.

14. The storage pallet according to claim 1, wherein a length of the third stop member along the first direction is greater than or equal to a length of the avoidance region along the first direction.

15. The storage pallet according to claim 1, wherein:

a mounting position of the third stop member relative to the connecting arm is adjustable along the second direction; and/or the third stop member is detachably connected to the connecting arm.

16. The storage pallet according to claim 1, wherein the connecting arm and the two bracket arms are integrally formed members.

17. An automated guided vehicle, comprising:

a rack body, wherein the rack body comprises a chassis and a vertical frame disposed on the chassis, the vertical frame is provided with a plurality of storage pallets spaced apart along a vertical direction and each being the storage pallet according to claim 1, two sides of the vertical frame in the second direction are respectively a first side and a second side, and each storage pallet is on a second side of the vertical frame; and a pick-and-place assembly, wherein the pick-and-place assembly is connected to the rack body and configured to be lifted and rotated on the first side of the vertical frame, the pick-and-place assembly comprises a telescopic fork, and the avoidance region is configured to avoid the fork when the fork picks or places a commodity from or onto the storage pallet.

18. The automated guided vehicle according to claim 17, wherein the chassis comprises a first portion and a second portion, the first portion is on the first side of the vertical frame, the second portion is on the second side of the vertical frame, an end, farther away from the vertical frame, of the first portion is provided with a first obstacle avoidance apparatus, an end, farther away from the vertical frame, of the second portion is provided with a second obstacle avoidance apparatus, and the first obstacle avoidance apparatus and the second obstacle avoidance apparatus are located at diagonal positions of the chassis.

19. The automated guided vehicle according to claim 17, wherein the pick-and-place assembly has a first vision apparatus, and a second vision apparatus is present on a top of the vertical frame.

* * * * *